United States Patent [19]
Nakagawa et al.

[11] Patent Number: 5,353,125
[45] Date of Patent: Oct. 4, 1994

[54] FACSIMILE APPARATUS

[75] Inventors: Michihiro Nakagawa; Kazuo Izumi; Hirohiko Yamazaki; Kunio Shijo, all of Tokyo, Japan

[73] Assignee: Konica Corporation, Tokyo, Japan

[21] Appl. No.: 13,017

[22] Filed: Feb. 2, 1993

[30] Foreign Application Priority Data

Feb. 5, 1992 [JP] Japan .................... 4-019966

[51] Int. Cl.$^5$ .............................................. H04N 1/00
[52] U.S. Cl. .................... 358/439; 358/434; 358/435
[58] Field of Search ............. 358/439, 434, 435, 436, 358/438

[56] References Cited

U.S. PATENT DOCUMENTS

| | | | |
|---|---|---|---|
| 4,736,249 | 4/1988 | Iizuka et al. | 358/435 |
| 4,878,242 | 10/1989 | Springer et al. | 358/434 |
| 4,910,506 | 3/1990 | Yoshida et al. | 358/400 |
| 5,208,682 | 5/1993 | Ahmed | 358/434 |

FOREIGN PATENT DOCUMENTS

| | | |
|---|---|---|
| 0426336A3 | 5/1991 | European Pat. Off. . |
| 2169174A | 7/1986 | United Kingdom . |
| WO-A-9101607 | 2/1991 | World Int. Prop. O. . |

OTHER PUBLICATIONS

Patent Abstracts of Japan, vol. 10, No. 11 (E-374) Jan. 17, 1986 & JP-A-60 174 574 (Sanyo Denki KK) Sep. 1985.
Electronics and Communications Journal, vol. 3, No. 5, Oct. 31, 1991, London, pp. 223-231, XP000265404, A. Pugh "Facsimile Today".
Patent Abstracts of Japan, vol. 11, No. 220 (E-524) Jul. 16, 1987 & JP-A-62 039 964 (Ricoh Co. Ltd.), Feb. 20, 1987.
Patent Abstracts of Japan, vol. 6, No. 238 (E-144) Nov. 26, 1982 & JP-A-57 138 269 (Nippon Denshin Denwa Kosha), Aug. 26, 1982.
Patent Abstracts of Japan, vol. 14, No. 218 (E-925) May 9, 1990, & JP-A-20 53 380 (Ricoh Co. Ltd.) Feb. 22, 1990.

*Primary Examiner*—Edward L. Coles, Sr.
*Assistant Examiner*—Thomas L. Stoll
*Attorney, Agent, or Firm*—Frishauf, Holtz, Goodman & Woodward

[57] ABSTRACT

A facsimile apparatus in a first station with an error correction mode retransmits signal again in response to a request from a section station. The facsimile apparatus includes a CPU to control a transmission speed of the signal transmission circuit so as to transmit operation control signals such as page information signals relating to a document and post message command signals indicating an operation that is to follow a present operation, at a first transmitting speed that corresponds to a transmission speed used to transmit image signals.

6 Claims, 15 Drawing Sheets

FIG. 6

| A | C | FCF | FIF(CORRECTED INFORMATION BIT MAP) | |
|---|---|---|---|---|
| | | INFORMATION SHOWING EXTENDED PPR | FRAME NUMBER | PAGE INFORMATION / PPS - XXX | TRANSMISSION SPEED |

FACSIMILE APPARATUS

BACKGROUND OF THE INVENTION

The present invention relates to a facsimile apparatus having an error correction mode, and especially to a facsimile apparatus which can reduce the time necessary for the procedure between pages and the subsequent procedure (a procedure subsequent to the last page image information transmission procedure) for communication.

In prior facsimile apparatuses, generally, image information is transmitted at a high speed of, for example, 14.4 Kbps or the like, and other control signals are transmitted at a low speed of about 300 bps. In FIGS. 11 to 15, transmission procedures in an error correction mode of a facsimile apparatus having the error correction mode are shown. As is widely known, the error correction mode is a mode in which image information, having errors caused by noises, is sent again to a receiving side at its request, so that the receiving side can correctly receive the image information.

FIG. 11 shows a single page image information transmission procedure in which: when a transmission side dials and a communication line is connected with a receiving side, a CED signal (a called station identification signal) is sent from the receiving side to the transmission side at 300 bps; and next, an NSF signal (a non-standard device signal), a CSI signal (a called station identification signal), and a DSI signal (a digital identification signal) are sent to the transmission side. Next, a TSI signal (a transmission station identification signal), and a DCS signal (a digital command signal) are sent from the transmission side to the receiving side.

When the preceding procedure (a procedure preceding the first page image information transmission procedure) has been completed as described above, a training signal T is sent from the transmission side at high speed, and a transmission speed of the image information is determined thereby. After that, the image information is divided into n frames, and the frames, from frame 1 to frame n, are successively sent to the receiving side. When the image information has been sent out, an RCP signal (a Return to Control for Partial Page signal) is sequentially sent out three times.

Next, a preamble Pr and a PPS-EOP signal (a Partial Page Signal-End Of Page signal, an EOP signal being a procedure completion signal) are sent out. This signal includes information by which the number of transmitted frames of image information is shown. Next, the preamble Pr and an MCF signal (a message confirmation signal) are sent out from the receiving side.

After the transmission side has received the above signals, the transmission side sends the preamble Pr and a DCN signal (a disconnection command signal), and thereby the communication line is disconnected and the communication is completed. In these communication procedures, a procedure subsequent to the RCP signal takes a relatively long period of time, 3.805 s, in the example. This is because each control signal is transmitted at the low speed of 300 bps so that communication can be surely performed.

FIG. 12 shows a multi-page transmission procedure, which is a communication procedure when a mode, such as resolution or density, is not changed. In the explanation of the example, the preceding procedure will be neglected hereinafter. In the drawing, after the transmission side has sent out the n-th page image information subsequent to the training signal, the RCP signals are successively sent out three times. Next, the transmission side sends out the preamble Pr and a PPS-MPS signal (a PPS-Multi Page Signal, an MPS signal being a multi-page signal). The PPS-MPS signal shows that image information of the n-th page has been transmitted and the control returns to phase C.

After receiving the above signals, the receiving side sends out the preamble and the MCF signal. Subsequently, the transmission side sends the training signal T, and next, sends the image information of the (n+1)th page. After the information of all pages has been sent out, the subsequent procedure is carried out in the same way as shown in FIG. 11, and communication is completed. In this case, the procedure between pages is also carried out at the transmission speed of 300 bps, and it takes 1.745 s.

FIG. 13 shows a transmission procedure when a mode is changed in the multi-page transmission. In this case, the transmission side sends a PPS-EOM signal (an EOM signal: an end of message signal) at the transmission speed of 300 bps in the procedure between pages. After the receiving side has sent the MCF signal, a waiting time of 6 s is provided for a modal change in the receiving side, and after that, the receiving side sends the NSF signal, CSI signal, and DIS signal in the same way as the foregoing.

After receiving the above signals, the transmission side sends the TSI signal and DCS signal. Next, the training signal T is sent out and the transmission speed is determined. After that, the image information of the (n+1)th page is sent out. After the image information of all pages has been sent out, the same procedure as shown in FIG. 11 is carried out and the communication is completed. In this case, the procedure between pages takes 8.57 s.

FIG. 14 shows a transmission procedure when an error frame is generated. In this case, the transmission side sends the preamble Pr and a PPS-XXX signal (XXX means any of EOP, MPS or EOM) in the procedure between pages, and next, the receiving side sends the preamble Pr and a PPR signal (a Partial Page Request signal). Information of a frame number in which an error has occurred, for example, a frame number 5 or 8, is included in the PPR signal.

After receiving the error frame information, the transmission side sends again the frame in which an error has occurred. Thereby, image information containing no error can be sent and received. In this case, the procedure between pages takes 3.485 s. The subsequent procedures are performed in the same way as shown in FIG. 11.

FIG. 15 shows a transmission procedure in the case where an error frame has been generated and a fall back is performed, that is, in the case where a transmission speed is lowered when the error has occurred. In the drawing, in the case where an error has occurred when the n-th page image information has been sent, for example, at the transmission speed of 14.4 Kbps, the PPS-XXX signal is sent in the same way as shown in FIG. 14 from the transmission side, and next, the PPR signal is sent from the receiving side.

Subsequent to the foregoing, the transmission side sends the preamble Pr and a CTC signal (a Continue To Correct signal). In the CTC signal, information of the transmission speed of the next image information is included. In this case, a transmission speed lower than the preceding transmission speed of 14.4 Kbps, for example, 9.6 Kbps is set. After receiving the signal, the receiving side sends the preamble Pr and a CTR (Response for Continue to Correct) signal. The CTR signal means that the CTC signal has been received.

Due to the foregoing, the procedure between pages is performed in the time of 6.005 s. After that, information of a frame in which an error has occurred is sent again at the transmission speed of 9.6 Kbps. Thus, when an error occurs, the transmission speed is lowered one step by one step, and communication is performed. The subsequent procedure is performed in the same way as shown in FIG. 11.

As described above, in the prior facsimile apparatus having an error correction mode, the image information and the RCP signal are sent out at the high transmission speed of 14.4 Kbps the maximum, and other control signals except the RCP signal are sent at a low transmission speed of 300 bps, so that the procedure between pages and the subsequent procedure take a relatively long time. Especially, when it is necessary to send information of a lot of pages, it takes a long time to transmit the information, so that the communication costs are increased.

SUMMARY OF THE INVENTION

The present invention has solved the above-described problem, and the object of the invention is to provide a facsimile apparatus which can reduce transmission time.

In order to solve the above-described problem, a facsimile apparatus having an error correction mode of the first embodiment is characterized in that: a period of time in which a procedure between pages and a subsequent procedure are performed can be reduced by the method in which page information, such as resolution or paper width, and a post message command indicating completion of page transmission and the next procedure, are sent from an image information transmission side at the same transmission speed as that of the image information.

The facsimile apparatus having an error correction mode of the second embodiment is characterized in that: a period of time in which a procedure between pages is performed can be reduced by the method in which retransmission of page information or a post message command of the page in which an error has occurred, and transmission of the next transmission speed are required, from the receiving side to the transmission side, when the error has occurred in page information, including resolution and paper width, or in the post message con, hand indicating the completion of transmission of the page information, and the next procedure.

Reduction of the subsequent procedure will be described as follows. In FIG. 2, after the preceding procedure (not shown in the drawing) has been performed, the training signal T, the page information and the image information (frame 1 to frame n) are sent at a high transmission speed (14.4 Kbps to 2.4 Kbps) from the transmission side. After that, three sequential post command messages (PPS-EOP signal) are sent at the same transmission speed as that of the image information. Information with respect to the completion of transmission of the image information is included in the PPS-EOP signal.

Next, the preamble Pr and the MCF signal are sent from the receiving side. After receiving the signals, the transmission side sends the preamble Pr and the DCN signal, and connection with a communication line is disconnected, communication being completed. In this case, the PPS-EOP signal, which has been conventionally sent at the transmission speed of 300 bps in the subsequent procedure, is sent at higher transmission speed, and thereby the time necessary for the subsequent procedure can be reduced by 2.335 s (=3.805−1.47) compared with the time necessary for the conventional method.

Next, reduction of the procedure between pages will be described as follows. In FIGS. 3 and 4, three sequential post message commands (PPS-MPS signal or PPS-EOM signal) are sent subsequent to the n-th page image information at a high transmission speed from the transmission side, and next, the Pr and MCF signals are sent at the transmission speed of 300 bps. After receiving the signals, the transmission side sends an (n+1)th page image information at a high transmission speed. In this case, the PPS-MPS signal, which has been conventionally sent at the transmission speed of 300 bps (refer to FIGS. 12 and 13), is sent at the high transmission speed, and thereby the time necessary for the procedure between pages can be greatly reduced.

When an error has occurred in the image information, three sequential PPS-EOP signals are sent subsequent to the image information at a high transmission speed from the transmission side as shown in FIG. 5 and FIG. 7. After receiving the signals, the receiving side sends the preamble signal Pr and an extended PPR signal at the transmission speed of 300 bps. As shown in FIG. 6, the extended PPR signal includes a frame number, a page information, a PPS-XXX signal, and a transmission speed, which are to be retransmitted.

Due to the foregoing, the information in which an error has occurred, can be retransmitted. In this case, the receiving side requires a signal including a transmission speed or other information, and therefore, the time necessary for transmission and reception of control signals can be reduced to the minimum. Accordingly, the time necessary for the procedure between pages can be greatly reduced.

BRIEF DESCRIPTION OF THE DRAWINGS

FIG. 6 is a view illustrating an extended PPR signal.

DETAILED DESCRIPTION OF THE PREFERRED EMBODIMENT

Figure 1:
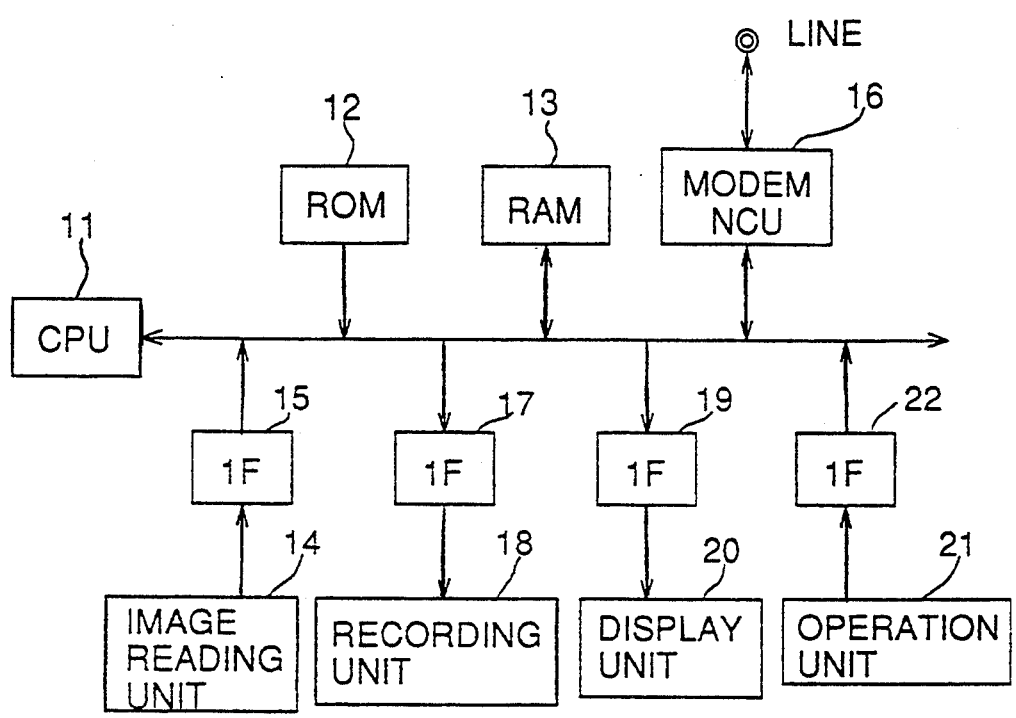
FIG. 1 is a view showing a structure of the facsimile apparatus of the present invention.

Referring to the drawings, an example of a facsimile apparatus of the present invention will be described in detail as follows.

FIG. 1 shows a structure of a facsimile apparatus according to the present invention. In FIG. 1, numeral 11 denotes a CPU which controls transmission, numeral 12 denotes a ROM in which each kind of control program, such as a program for transmission and for reception, is stored, and numeral 13 denotes a RAM in which image information to be transmitted and other information are stored.

After the image information read by an image reading unit 14 is stored in the RAM 13 through an interface 15 or directly, the image information is sent to a modem which functions as a transmission and reception means, and to a network control unit (NCU) 16. Image information which is inputted from a communication line is stored in the RAM 13 through the modem and the NCU 16, or is sent to a recording unit 18 which functions as a printer, directly through an interface 17, and recorded thereby.

Information such as a telephone number of a receiver, is sent to a display unit 20 through an interface 19 and displayed thereon. An operation unit 21 is provided with a plurality of keys (not shown in the drawing). When the keys are operated, the content of information inputted by the keys is inputted into the CPU 11 through an interface 22.

Next, referring to FIGS. 2 to 10, a transmission procedure in the case of an error correction mode in the facsimile apparatus will be described as follows. In this case, an explanation of the preceding procedure is omitted because it is the same as that in the foregoing.

Figure 2:
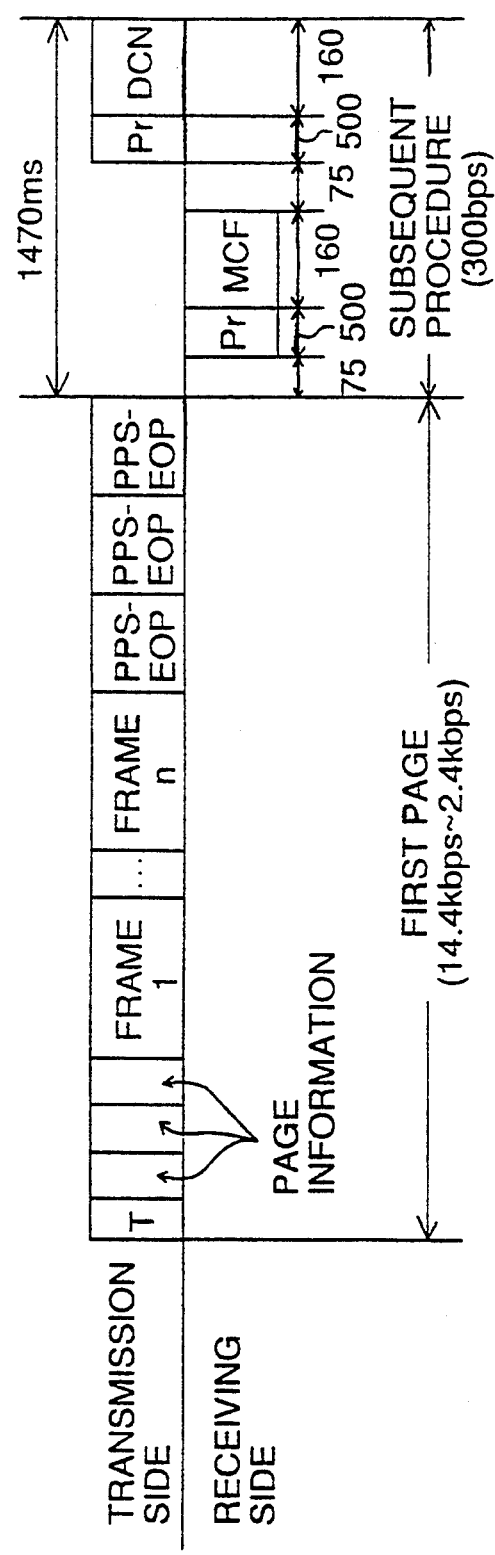
FIG. 2 is a view illustrating a transmission procedure in single page transmission in the facsimile apparatus of the example.

FIG. 2 shows a transmission procedure in the case of single page transmission, in which a training signal T is sent from the transmission side at a transmission speed of 14.4 Kbps, and next, page information is sent at the transmission speed of 14.4 Kbps. This page information includes the content which is contained in a DCS signal sent in the preceding procedure, that is, paper width, coding method, and line density. Next, image information is sent out, and after that, three sequential PPS-EOP signals are sent at the same high transmission speed as that of the image information.

Figure 11:
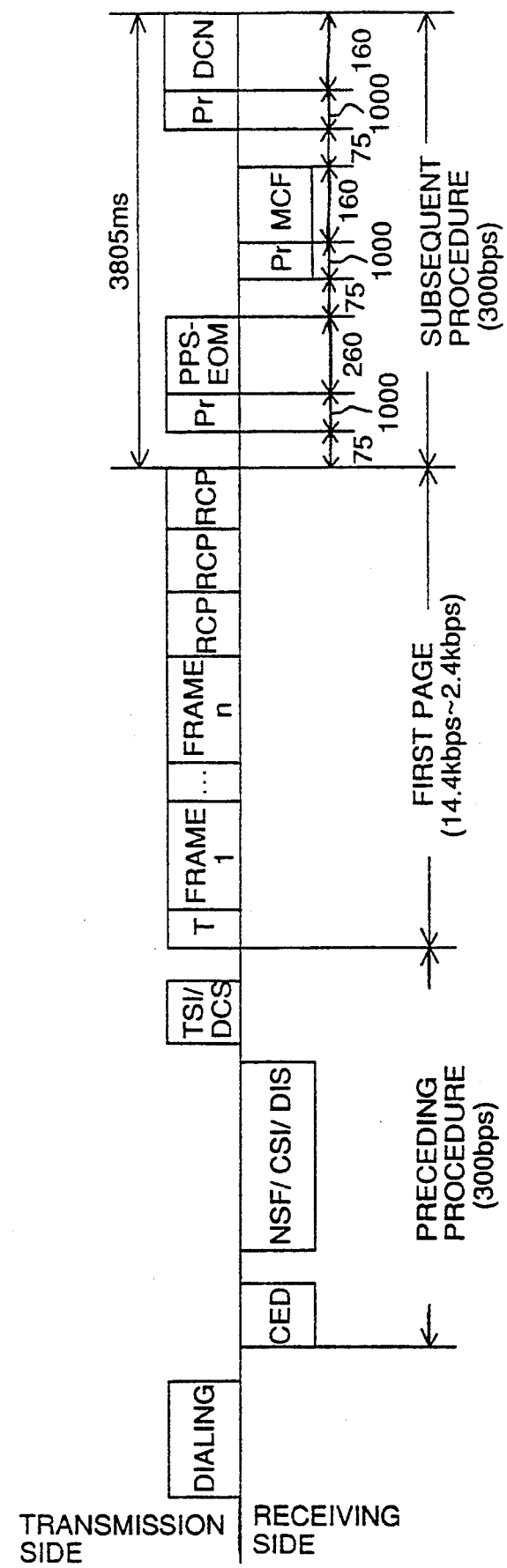
FIG. 11 is a view illustrating a transmission procedure in the case of single page transmission in a conventional facsimile apparatus.
Figure 12:
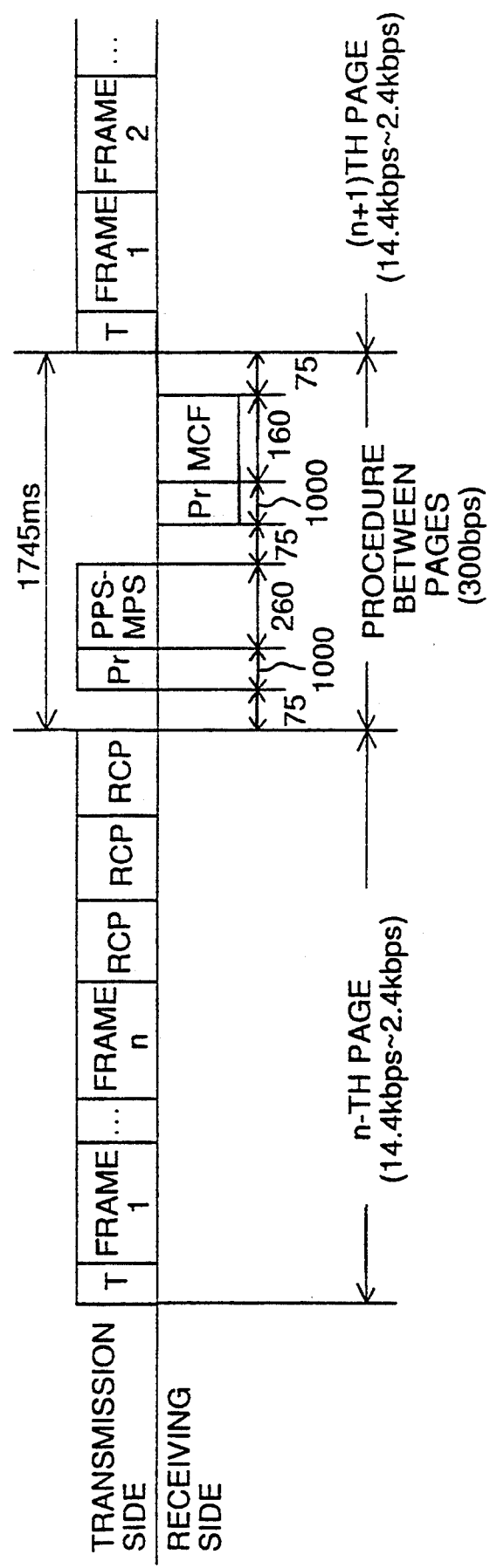
FIG. 12 is a view illustrating a transmission procedure at the time of no modal change in the case of multi-page transmission in the conventional facsimile apparatus.
Figure 13:
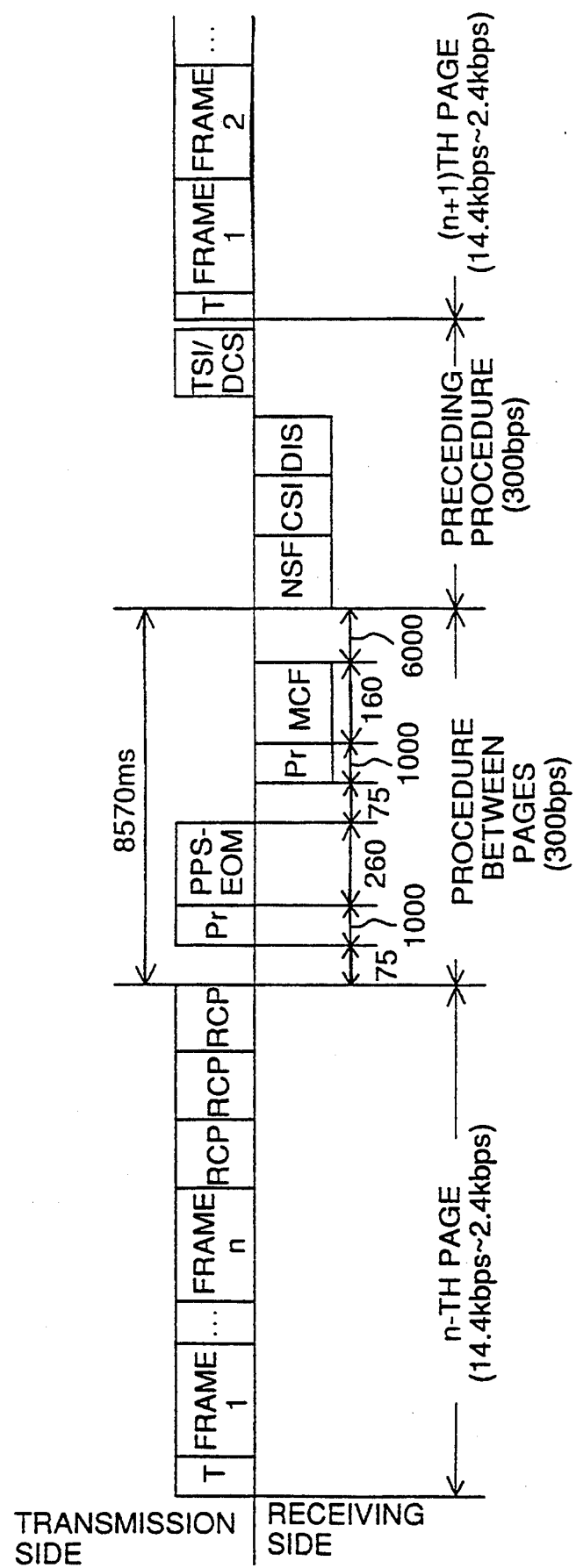
FIG. 13 is a view illustrating a transmission procedure at the time when a modal change exists in the case of multi-page transmission in the conventional facsimile apparatus.
Figure 14:
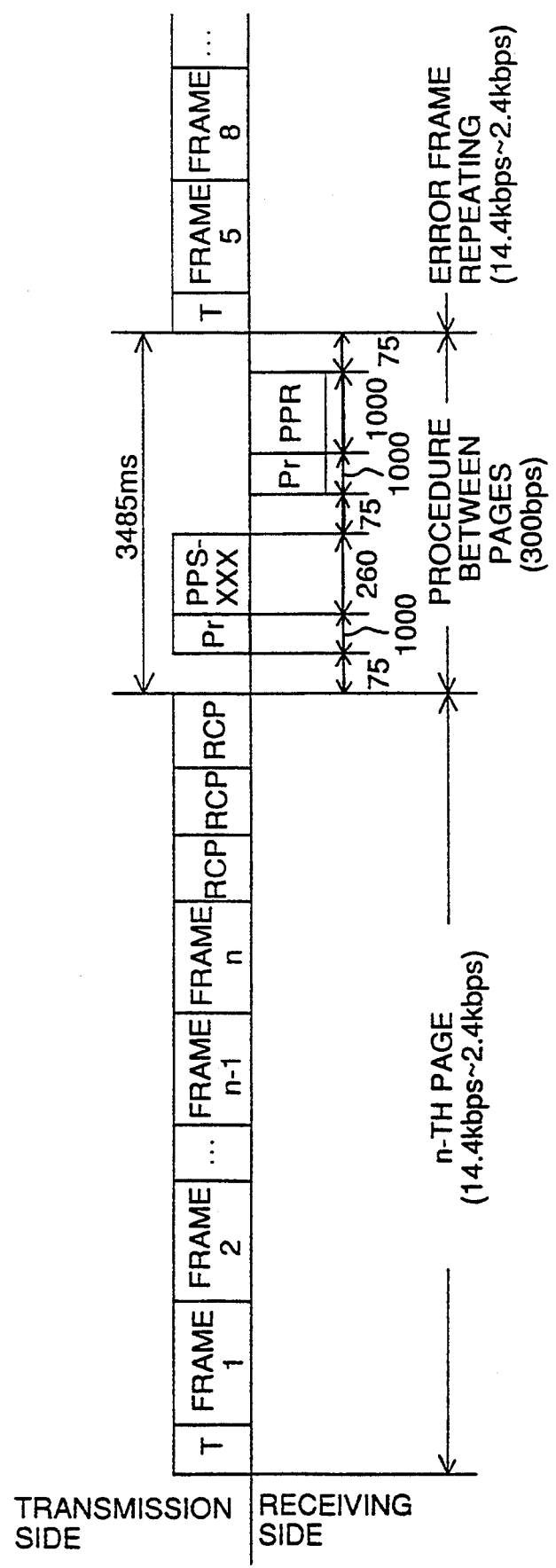
FIG. 14 is a view illustrating a transmission procedure in the case where an error occurs in a conventional facsimile apparatus.
Figure 15:
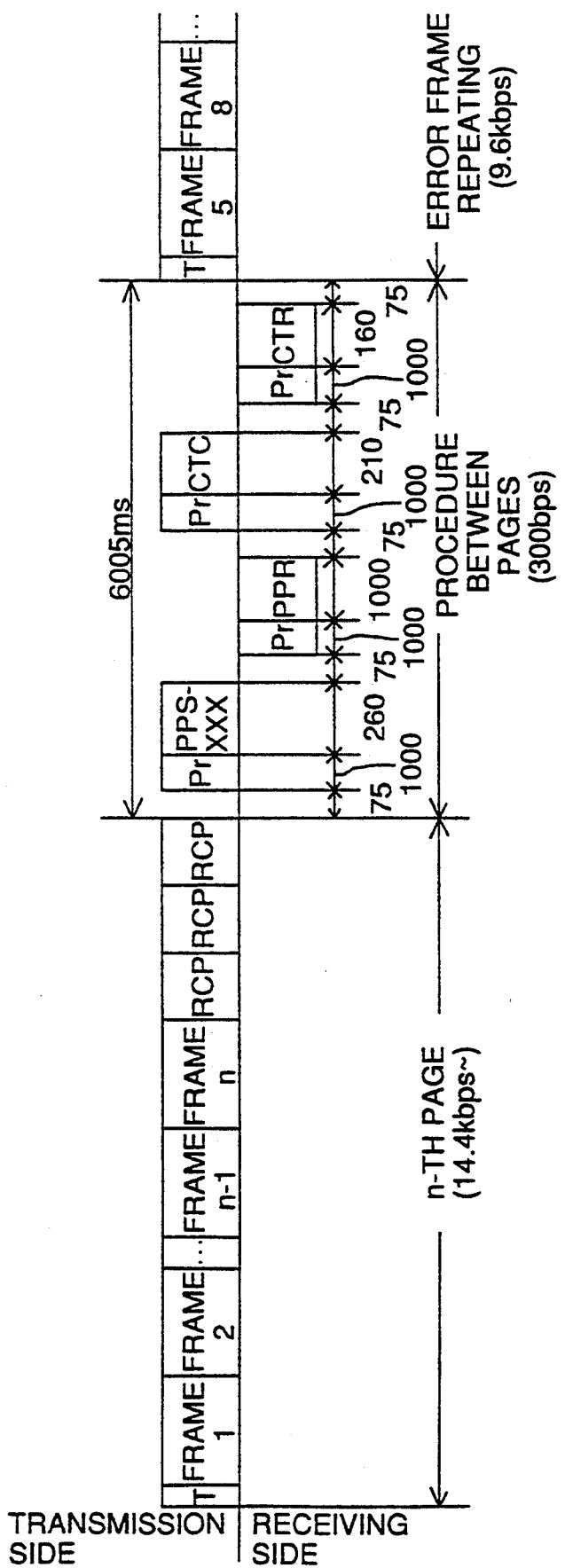
FIG. 15 is a view illustrating a transmission procedure at the time of a fall back in the case where an error occurs in a conventional facsimile apparatus.

Next, a preamble Pr and an MCF signal are sent from the receiving side at a low transmission speed of 300 bps. After the signals have been received, the transmission side sends the preamble Pr and a DCN signal, and thereby connection with the communication line is disconnected and communication is completed. According to the transmission procedure, the time necessary for the subsequent procedure is 1.47 s, and thereby it can be reduced by 2.335 s (=3.805−1.47) as compared with that of a conventional method (FIG. 11).

In the case of single page transmission, page information is contained in the DCS signal of the preceding procedure, and therefore, the page information which is sent before the image information can be neglected. However, in this specification, the page information is sent in order to comply with other cases.

Figure 3:
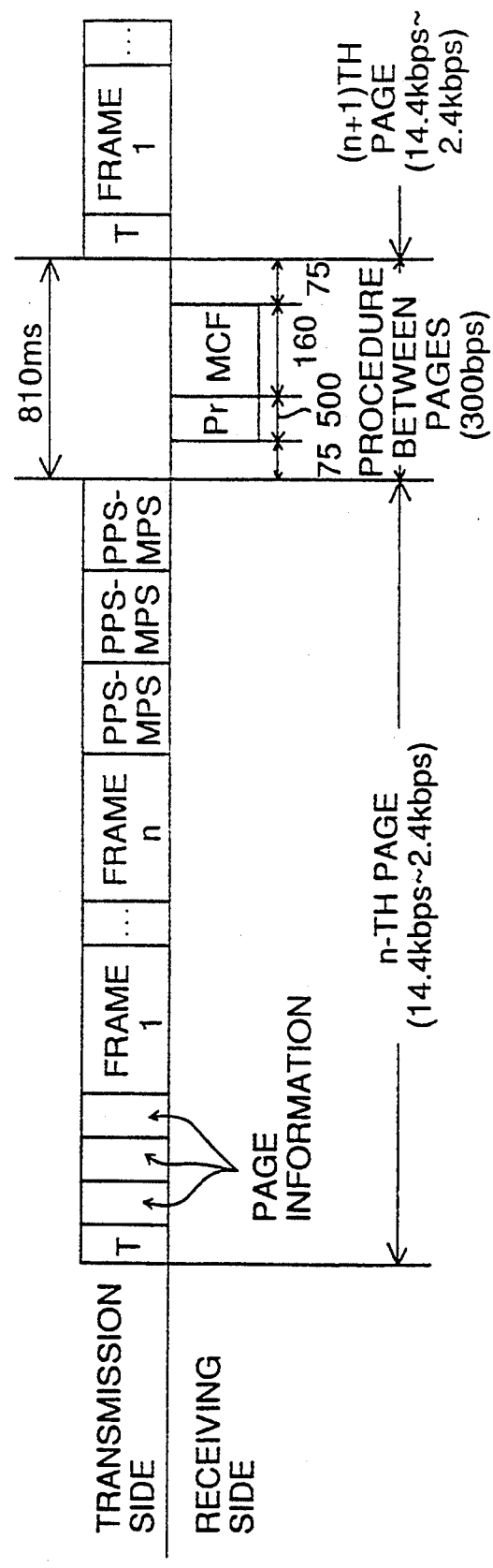
FIG. 3 is a view illustrating a transmission procedure at the time of no modal change in the case of multi-page transmission in the facsimile apparatus of the example.

FIG. 3 shows a transmission procedure in the case of multi-page transmission when no mode is changed. In this case, the training signal T, the page information, and n-th page image information are sent at a high speed in the same way as that in FIG. 2, and after that, three sequential PPS-MPS signals are sent at the high transmission speed. Next, the receiving side sends out the preamble Pr and the MCF signal. After receiving the signals, the transmission side sends the training signal T, and (n+1)th page information at high transmission speed. Here, the (n+1)th page information is neglected because it is the same as that of n-th page. In this case, time for the procedure between pages can be reduced by 0.935 s (=1.745−0.81) as compared with that of a conventional method.

Figure 4:
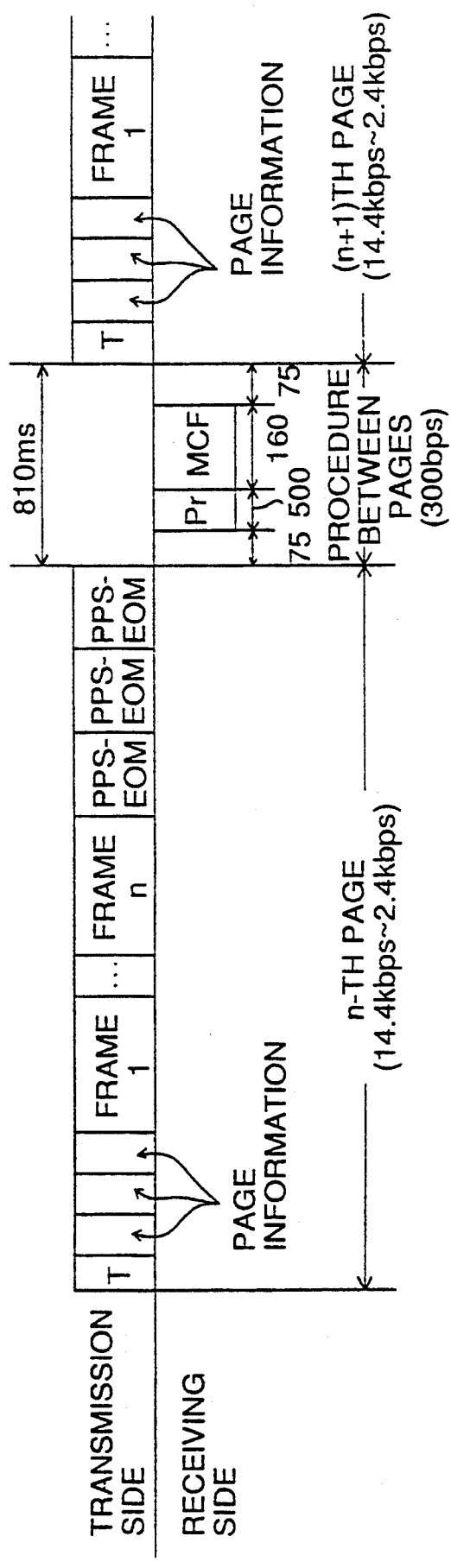
FIG. 4 is a view illustrating a transmission procedure at the time of a modal change in the case of multi-page transmission in the facsimile apparatus of the example.

FIG. 4 shows a transmission procedure in the case of multi-page transmission when a mode is changed. In this case, the training signal T, page information and n-th page image information are sent at a high transmission speed, and after that, three sequential PPS-EOM signals are sent at the same transmission speed as that of the image information. Next, the receiving side sends the preamble Pr and an MCF signal. After receiving the signals, the transmission side sends the training signal, the (n+1)th page information, and the second page image information. In this case, time necessary for the procedure between pages can be reduced by 7.76 s (=8.57−0.81).

Figure 5:
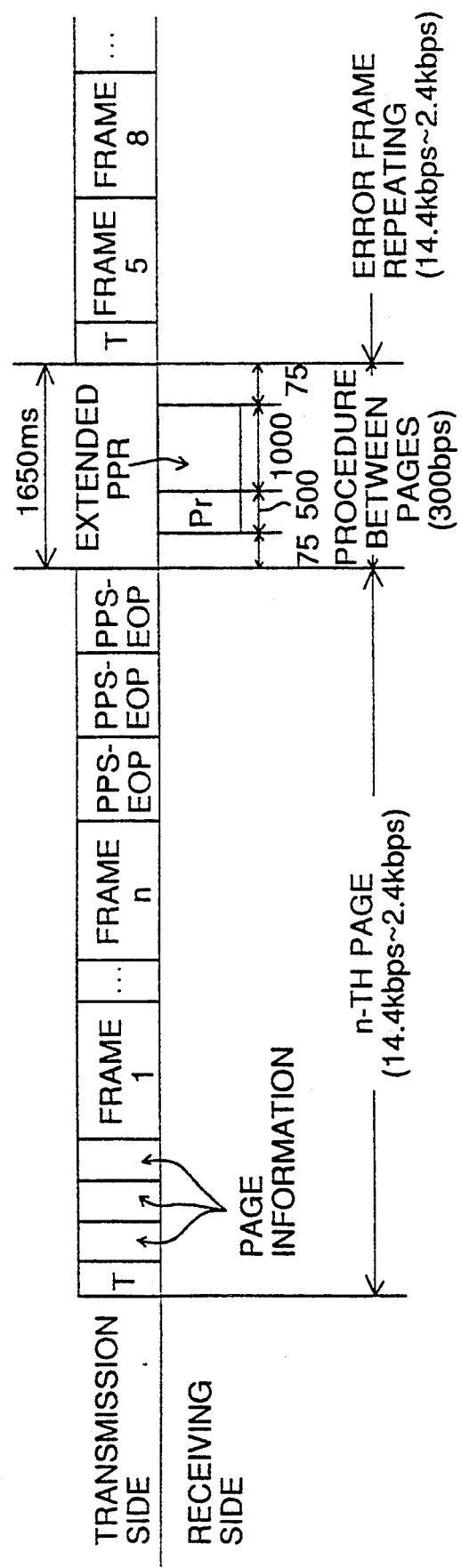
FIG. 5 is a view illustrating a transmission procedure at the time when an error frame exists in the facsimile apparatus of the example.

FIG. 5 shows a transmission procedure in the case of single page transmission when an error has occurred. In this case, the training signal T, the page information and the image information are sent at a high transmission speed after the preceding procedure. Next, three sequential PPS-EOP signals are sent at a high transmission speed.

In this case, an error has occurred in the image information, and the receiving side sends the preamble Pr and an extended PPR signal. The extended PPR signal is defined as a nonstandard signal in the present invention, in which, as shown in FIG. 6, a request for retransmission of the page information, a PPS-XXX signal, and the transmission speed, is added to a standard PPR signal.

That is, a frame of the extended PPR signal is composed of an address A, a control field C, a facsimile control field FCF, and a facsimile information field FIF (retransmission information bit map). FCF contains information showing that this signal is the extended PPR signal. FIF contains the number of the error frame, information whether an error has occurred or not in the page information, information whether an error has occurred or not in the PPS-XXX signal, and a transmission speed when an error has occurred.

A binary number [0] is set in bits of the frame of the image information, the page information, the control signal, and the transmission speed which have been correctly received in the extended PPR signal. A binary number [1] is set in bits in which an error has occurred. When the extended PPR signal is received, the transmission side sends the training signal T and required frames. Due to the foregoing, information of all pages are sent, and next, the same subsequent procedure as that in FIG. 2 is carried out, and the communication is completed. In this case, the time necessary for the procedure between pages can be reduced by 1.835 s (=3.485−1.65).

Figure 7:
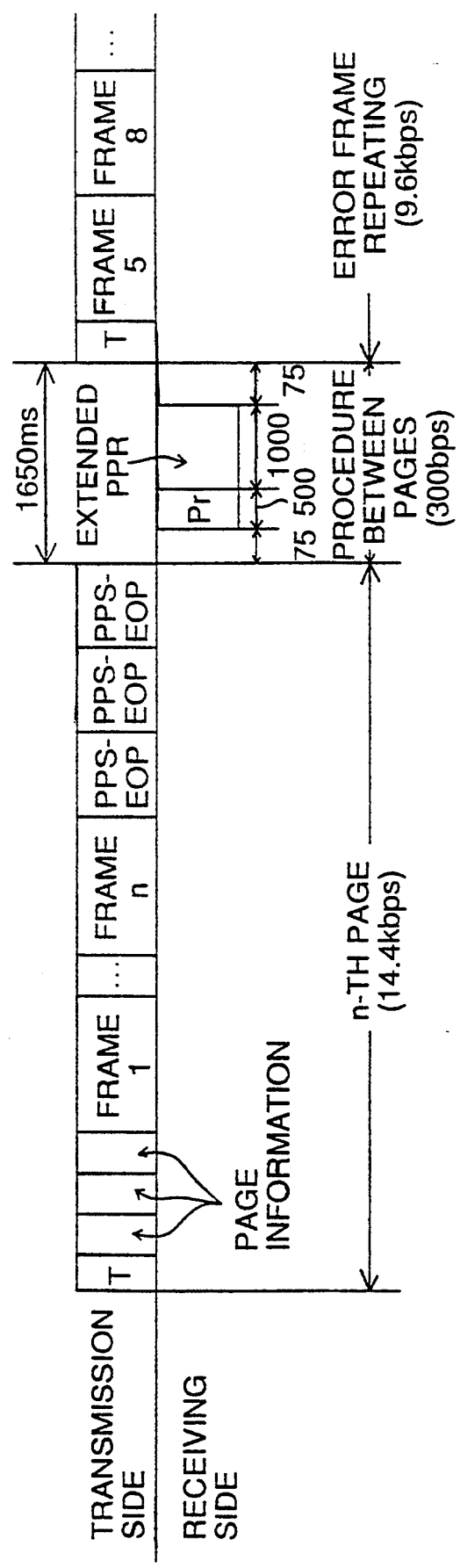
FIG. 7 is a view illustrating a transmission procedure at the time when a fall back is performed in the case where an error frame exists in the facsimile apparatus of the example.

FIG. 7 shows the transmission procedure in the case where an error has occurred and a fall back is carried out. In this case, the transmission side sends the training signal T, the page information, the n-th page image information at a high transmission speed of, for example, 14.4 Kbps, and next, three sequential PPS-XXX signals are sent at the transmission speed of 14.4 Kbps. Next, the receiving side sends the preamble Pr and the extended PPR signal. The transmission speed of, for example, 9.6 Kbps of the next image information is contained in the extended PPR signal. That is, in this case, the receiving side requires the information of the transmission speed of the image information.

After receiving the signals, the transmission side sends the training signal T and the required frames at the transmission speed of 9.6 Kbps. Thus, after the image information of all pages has been sent, the same subsequent procedure as that in FIG. 2 is carried out, and communication is completed. In this case, the time required for the procedure between pages can be reduced by 4.355 s (=6.005−1.65). In this case, when an error has occurred even when the transmission speed of the image information is lowered to, for example, 2.4 Kbps, it is regarded as a fall-back-over, and therefore, the transmission side may send a DCN signal to finish the communication. This is because low speed communication does not comply with the time shortening which is a main object of the present invention.

Figure 8:
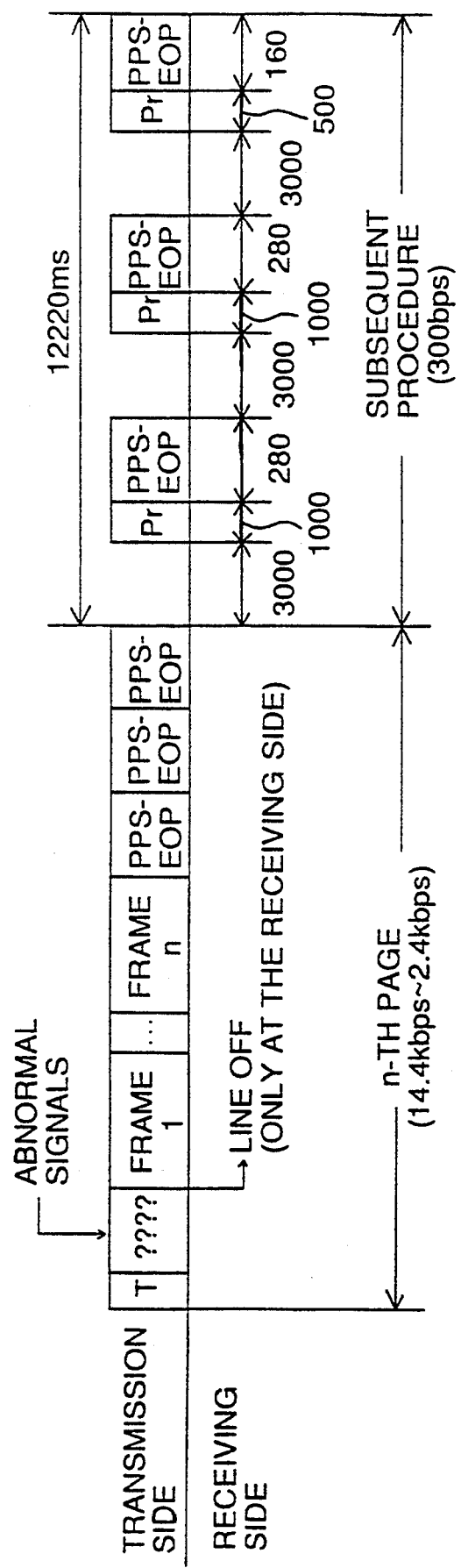
FIG. 8 is a view illustrating a transmission procedure in the case where an abnormal command is received in the facsimile apparatus of the example.
Figure 9:
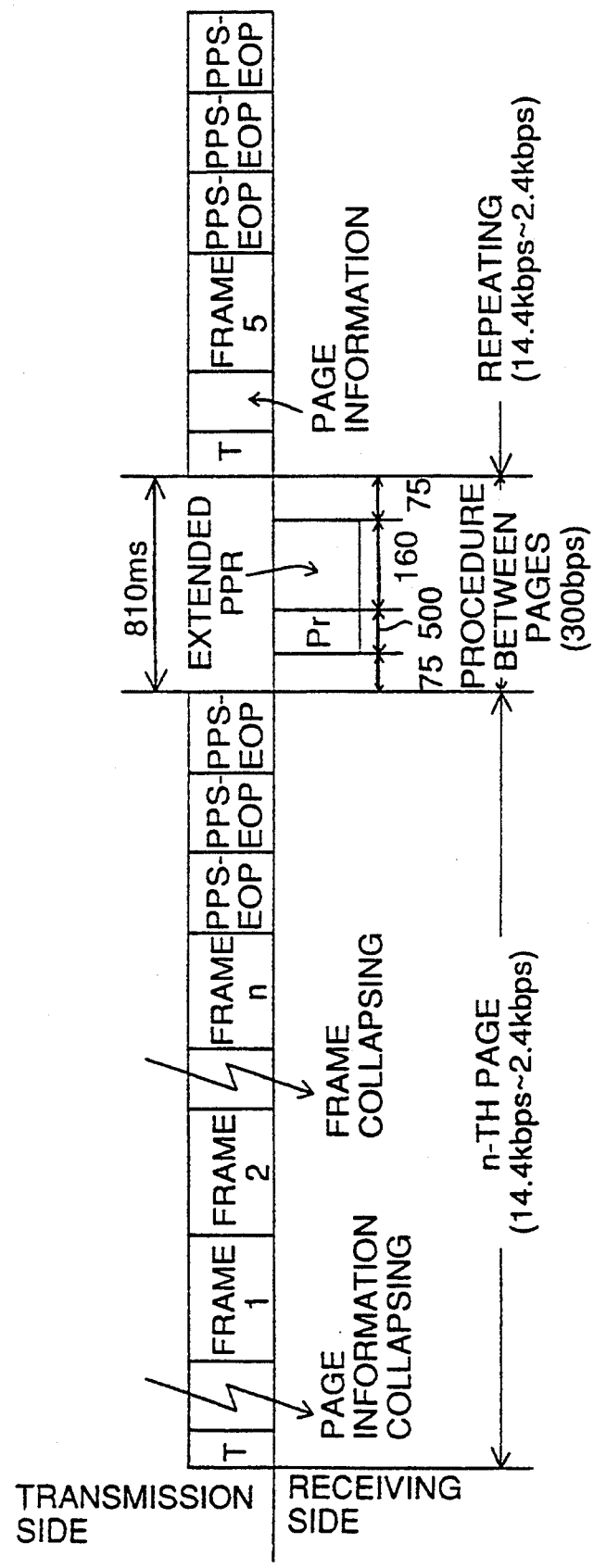
FIG. 9 is a view illustrating a transmission procedure in the case where page information collapsing occurs in the facsimile apparatus of the example.
Figure 10:
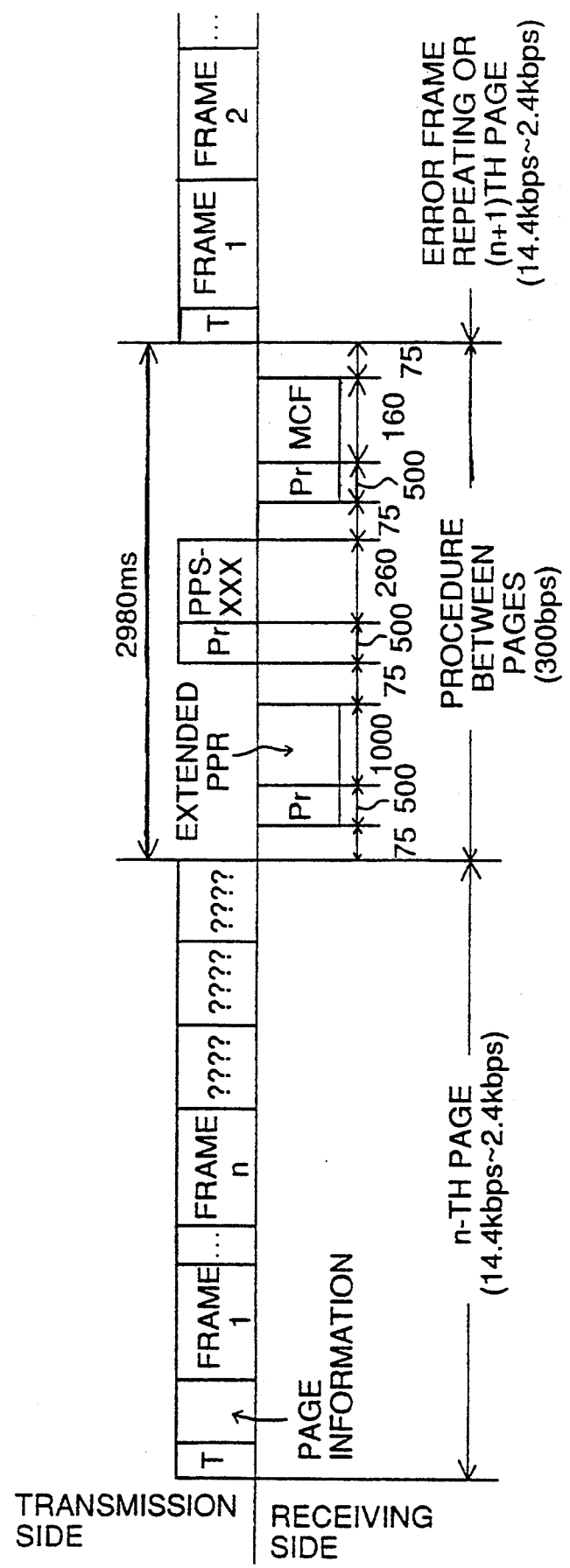
FIG. 10 is a view illustrating a transmission procedure in the case where control information collapsing occurs in the facsimile apparatus of the example.

FIGS. 8 to FIGS. 10 show transmission procedures in the case where abnormality has occurred in the communication. FIG. 8 shows the transmission procedure in the case where page information which is outside the capacity of communication, for example, resolution which is outside the capacity of the transmission side, has been indicated, or an abnormal signal, the meaning of which can not be understood, has been received. In this case, the receiving side sends the DCN signal in the middle of reception of the signal, and disconnects the connection with the communication line.

The transmission side sends the image information and the PPS-XXX signal at a high transmission speed in the same way as in the case of normal communication. Then, since the answer with respect to the signal is not sent from the receiving side, the PPS-XXX signal is sent two times over a time interval at the transmission speed of 300 bps. Since the answer is not sent from the receiving side even in this case, the transmission side sends the DCN signal, and thereby the communication is finished.

FIG. 9 shows the transmission procedure in the case where the page information or the image information has been collapsed, and has not been able to be received normally. In this case, the PPS-XXX signal is sent at a high transmission speed subsequent to the image information, and next, the receiving side sends the preamble Pr and the extended PPR signal at the transmission speed of 300 bps. As described above, the page information or the number of frames of the image information in which an error has occurred, is contained in the extended PPR signal. After receiving the signal, the receiving side transmits again the training signal T, the page information which is required for retransmission, and the image information at a high transmission speed. The subsequent procedure is the same as that in FIG. 2.

FIG. 10 shows the transmission procedure in the case where the PPS-XXX signal has been collapsed and has not been able to be received. In this case, since the PPS-XXX signal can not be received, the receiving side sends the preamble Pr and the extended PPR signal at 300 bps. After receiving the signals, the transmission side sends the PPS-XXX signal at the transmission speed of 300 bps. In this case, when an error does not exist in the page information and the image information, the receiving side sends the preamble Pr and the MCF signal at the transmission speed of 300 bps. Next, the transmission side sends the training signal T and the (n+1)th page image information. The subsequent procedure is the same as that in FIG. 2. In this case, time necessary for the procedure between pages can be reduced by 2.59 s (=5.57− 2.98) as compared with that of the conventional procedure between pages.

When an error has occurred in the page information or the image information, the receiving side sends the preamble Pr and the extended PPR signal after receiving the PPS-XXX signal, and thereby the page information or the image information in which an error has occurred, is required to be transmitted again. After receiving the signals, the transmission side transmits again the information.

As described above, in the first embodiment, the page information and the post command message are sent from the transmission side at the same transmission speed as that of the image information. Therefore, according to the first embodiment, the time required for transmission and reception of control signals which are carried out within a period of time necessary for the procedure between pages and the subsequent procedure, can be reduced to the minimum. As a result, the first embodiment is effective for reduction of the communication time and the communication cost.

Further, in the second embodiment, when an error has occurred in the image information, page information or post command message, the information in which an error has occurred, and its transmission speed are required to be sent from the receiving side to the transmission side. According to the second embodiment, the time necessary for transmission and reception of control signals which are carried out within the period of time necessary for the procedure between pages when an error has occurred can be reduced to the minimum. Therefore, the second embodiment is effective for reduction of the communication time and the communication cost.

What is claimed is:

1. A facsimile apparatus at one station for transmitting an image signal to or receiving an image signal from another station, via a communication path, said another station having said facsimile apparatus therein, the facsimile apparatus at said one station having an error correction mode to retransmit from said one station, a signal in response to a request of the another station, the facsimile apparatus comprising:

reading means for reading an image on each page of a document and for generating image signals;

transmitting means for dividing the image signals of each page of said document into plural frames and for transmitting the image signals of each frame of said plural frames as one transmission unit via the communication path to the another station to enable the another station to check for transmission errors in each of said plural frames; and receiving means for receiving from the another station a signal indicating an error frame number in which a transmission error occurred;

the transmitting means retransmitting image signals of the error frame number and being capable of changing a transmitting speed thereof in accordance with a type of signal being transmitted;

control means for generating page information signals and post message command signals for each page of said document, the page information signals being related to a type of document being transmitted and the post message command signals indicating at least a number of plural frames forming each page; and wherein the control means controls the transmitting means in the one station such that: the page information signals of a current page to be transmitted, are transmitted before a transmission of the image signals of the current page; and the post message command signals are transmitted plural consecutive times in place of a "return to control" signal at the end of the image signals of a last frame of the current page; and the page information signals and the post message command signals are transmitted at a speed that corresponds to a speed of the transmission of the image signals of each frame.

2. The apparatus of claim 1, wherein the page information signals include data regarding a resolution of the image signals and a width of the document read by the reading means.

3. The apparatus of claim 1, wherein the post message command signals include end page data and data relating to an image signal configuration.

4. The apparatus of claim 3, wherein:

the transmitting means comprises dividing means for dividing the image signals into a plurality of frames, each frame having a frame number; and said data relating to the image signal configuration includes frame numbers that are correlated to the frame numbers of the divided image signals.

5. The apparatus of claim 4, wherein each of the frames of the divided image signals is checked during the error correction mode.

6. The apparatus of claim 1, wherein the page information signals and the post message command signals are divided into a plurality of frames, and each of the plurality of frames is checked during the error correction mode of operation of the facsimile apparatus.

* * * * *